United States Patent [19]

Arterbury et al.

[11] Patent Number: 5,339,895
[45] Date of Patent: Aug. 23, 1994

[54] SINTERED SPHERICAL PLASTIC BEAD PREPACK SCREEN AGGREGATE

[75] Inventors: Bryant A. Arterbury, Houston, Tex.; James E. Spangler, Spring, both of Tex.

[73] Assignee: Halliburton Company, Houston, Tex.

[21] Appl. No.: 34,980

[22] Filed: Mar. 22, 1993

[51] Int. Cl.$^5$ .............................. E21B 43/00
[52] U.S. Cl. .................................... 166/227
[58] Field of Search ........................ 166/227-236

[56] References Cited

U.S. PATENT DOCUMENTS

| | | | |
|---|---|---|---|
| 1,874,035 | 8/1932 | Fletcher | 166/228 |
| 2,139,975 | 12/1938 | Utt | 166/158 |
| 2,335,558 | 11/1943 | Young | 166/5 |
| 2,554,343 | 5/1951 | Pall | 210/205 |
| 2,600,150 | 6/1952 | Abendroth | 166/5 |
| 2,826,805 | 3/1958 | Probst et al. | 29/182 |
| 2,963,163 | 12/1960 | Veres | 210/496 |
| 3,033,783 | 5/1962 | Lubben | 210/510 |
| 3,201,858 | 8/1965 | Valyi | 29/157.3 |
| 3,313,621 | 4/1967 | Mott, III | 75/12 |
| 3,567,437 | 3/1971 | Mott | 75/214 |
| 3,605,245 | 9/1971 | Zapf | 29/420.5 |
| 3,632,243 | 1/1972 | Mott | 425/78 |
| 3,746,642 | 7/1973 | Bergstrom | 210/446 |
| 3,785,038 | 1/1974 | Zapf | 29/420.5 |
| 3,785,409 | 1/1974 | Smith, III | 140/92.2 |
| 3,897,531 | 7/1975 | Overhoff et al. | 264/109 |
| 3,908,256 | 9/1975 | Smith, III | 29/163.5 CW |
| 3,958,634 | 5/1976 | Smith, III | 166/233 |
| 4,063,603 | 12/1977 | Rayborn | 175/65 |
| 4,071,937 | 2/1978 | Rohlig | 29/420 |
| 4,072,616 | 2/1978 | Rohlig | 210/493 R |
| 4,088,580 | 5/1978 | Spurlock | 210/323 T |
| 4,186,100 | 1/1980 | Mott | 210/496 |
| 4,217,141 | 8/1980 | Schrittwieser | 75/244 |
| 4,343,358 | 8/1982 | Gryskiewicz | 166/227 |
| 4,406,326 | 9/1983 | Wagner | 166/227 |
| 4,483,820 | 11/1984 | Schelb | 419/28 |
| 4,705,611 | 11/1987 | Grimes et al. | 204/129.1 |
| 4,755,265 | 7/1988 | Young | 204/45.1 |
| 4,811,790 | 3/1989 | Jennings, Jr. et al. | 166/278 |
| 4,821,800 | 4/1989 | Scott et al. | 166/228 |
| 4,856,591 | 8/1989 | Donovan et al. | 166/278 |
| 4,858,691 | 8/1989 | Ilfrey et al. | 166/278 |
| 4,917,183 | 4/1990 | Gaidry et al. | 166/278 |
| 5,004,049 | 4/1991 | Arterbury | 166/228 |

OTHER PUBLICATIONS

The Pall Porous Metals Filter Guide, Pall Trinity Micro Corp., Sep. 1978.

*Primary Examiner*—Thuy M. Bui
*Attorney, Agent, or Firm*—Tracy W. Druce; Mason C. Campbell

[57] ABSTRACT

A prepack well screen assembly for separating particulate material from formation fluid has inner and outer screens concentrically mounted in radially spaced relation around a perforated mandrel, thereby defining a prepack annulus in which a plurality of spherical plastic members are disposed. The concentric inner screen includes longitudinally extending rib wires spaced circumferentially around the mandrel, and a screen wire wrapped externally about the rib wires in a longitudinally spaced pattern to define spaced screen apertures for conducting formation fluids through the inner screen. The outer screen is a cylindrical fluid-porous, particulate-restricting member which is radially spaced from the inner screen to form the prepack annulus. The particulate-restricting member includes rib wires which are spaced circumferentially around the inner screen within the prepack annulus, and an outer screen wire wrapped externally about the rib wires to define the annulus. The outer screen wire is wrapped about the rib wires in a longitudinally spaced pattern to delineate spaced screen apertures for conducting formation fluids through the outer screen. The spherical plastic members are disposed within the prepack annulus and heated until the spherical plastic members become tacky and bond to each other to form a sintered, homogenous mass.

30 Claims, 4 Drawing Sheets

OUTER SCREEN   INNER SCREEN

SINTERED SPHERICAL PLASTIC BEAD PREPACK SCREEN AGGREGATE

BACKGROUND OF THE INVENTION

1. Field of the Invention

This invention relates generally to apparatus for completing downhole wells, and in particular to well screens for filtering unconsolidated material out of inflowing well fluid in water, oil gas and recovery wells.

2. Discussion of the Background

In the course of completing an oil and/or gas well, it is usual to first run a string of casing into the well bore and then run the production tubing inside the casing. At the site of the producing formation, the casing is perforated across one or more production zones to allow hydrocarbons to enter the casing bore. After the well is completed and placed in production, formation sand from unconsolidated formations may be swept into the flow path along with formation fluid. This sand is relatively fine and erodes production components in the flow path. In some completions, however, the well bore is uncased, and an open face is established across the oil or gas bearing zone. Such open bore hole arrangements are utilized, for example, in water wells, test wells and horizontal well completions. Similarly, after the well is completed and placed in production, formation sand from unconsolidated formations may also be swept into the flow path along with formation fluid.

With either cased or uncased well bores, one or more sand screens are installed in the flow path between the production tubing and the perforated casing. A packer may be set above and below the sand screen to seal off the annulus in the producing zone from non-producing formations.

Conventionally, the annulus around the screen in unconsolidated formations is packed with a relatively coarse sand or gravel which acts as a filter to reduce the amount of fine formation sand reaching the screen. To spot the gravel around the screen, a work string and service seal unit (SSU) is used. During completion, the service seal unit is employed to pump gravel through the work string where the gravel is squeezed into the producing formation around the screen. The gravel is pumped down the work string in a slurry of water or gel and is spotted to fill the annulus between the sand screen and the well casing. In well installations in which the screen is suspended in an uncased open bore, the gravel pack supports the surrounding unconsolidated formation.

However, with either cased well bores or uncased well bores, some spaces may remain that are not filled with gravel. These spaces eventually fill up with accumulated sand, which form sand plugs or bridges. Thus, fine formation sand finds its way through these bridges into the production flowpath and causes erosion, unless stopped by the sand screen.

In order to prevent fine formation sand from finding its way into the production, some sand screens employ a perforated mandrel which is surrounded by longitudinally extending spacer bars, rods or ribs and over which a continuous wire is wrapped in a carefully spaced spiral configuration to provide a predetermined axial gap between the wire turns. See for example, U.S. Pat. No. 3,785,409; U.S. Pat. No. 3,958,634; and U.S. Pat. No. 3,908,256. The predetermined aperture between turns permits formation fluids to flow through the screen, while the closely spaced wire turns exclude fine particulate material such as sand or gravel of a predetermined size which might penetrate the gravel pack surrounding the screen.

However, during the initial production period following the gravel packing operation, fine sand may be carried through the gravel pack before the gravel pack bridge stabilizes and yields clean production. Those fines tend to migrate through the gravel pack and screen and lodge within the inner annulus between the outer wire wrap and the perforated mandrel. In some instances, this can cause severe erosion of the screen and ultimate failure of the screen to reduce sand invasion. In other situations, the sand fines may include plugging materials which are carbonaceous, siliceous or organic solids which can completely plug the screen flow passages and terminate production shortly after completion. In deep wells, when the screen becomes plugged and the internal pressure in the production tubing is reduced, the formation pressure can collapse the screen and production tubing. Moreover, when a substantial amount of sand has been lost from the surrounding formation, the formation may collapse with resultant damage to the well casing, liner and/or screen, resulting in the reduction or termination of production.

One attempt to overcome the foregoing problem is to space the outer screen radially outward from the mandrel and interpose a prepack of gravel aggregate within the annular void formed between the inner mandrel and the outer wire screen. The prepacked gravel is sized appropriately to exclude the fines which accompany the formation fluid during initial production. Raw gravel, as well as epoxy resin coated gravel, have been used extensively in the annulus of prepacked well screens.

As disclosed in U.S. Pat. No. 4,917,183, it is also known to use spherical glass beads in prepacked well screens. However, it has been found that spherical glass beads are not well suited for gravel packing. The roundness of the glass beads creates problems when trying to hydraulically "stress" the gravel pack. In particular, if the outer surrounding screen has suffered erosion damage, thus exposing the annular prepack, the ball bearing effect of the glass beads, which acts as a natural lubricant, provides little resistance to channeling or movement of unconsolidated sands through the sand screen and into the production tubing, which ends in early erosive failure of the well screen and other production equipment. The glass beads are also susceptible to acid solubility, and most prepacked well screens are subject to retrieval problems due to their outer diameter being larger than that of a conventional well screen. In order to make prepacked well screens more easily retrievable, the inner mandrel is usually downsized, therefore creating restrictions in both production bore size and completion tool string bore size.

In some prepack arrangements, it is also known to utilize an inner wire cloth or steel woven fabric filter media in order to achieve maximum annular placement and retention of prepacked filter materials. See, for example, U.S. Pat. No. 4,858,691 and U.S. Pat. No. 4,856,591.

As disclosed in U.S. Pat. No. 5,004,049, a special clearance prepack well screen provides an outer wire wrap screen slightly larger than an inner wire wrap resistance welded screen. An advantage of the special clearance prepack is that the inner mandrel is only minimally downsized. The space in between, referred to as the "micro" annulus, is filled with an aggregate material. In such cases where this annular space is filled with loose (or non-consolidated) material, the aggregate is usually silica sand, glass beads, sintered bauxite, or nickel shot. However, if the outer screen suffers erosion damage, thus exposing the non-consolidated material, the prepack may provide little resistance to channeling or movement of unconsolidated sands through the sand screen and into the production tubing.

To avoid this disadvantage, these aggregate materials may be intermixed with a plasticized epoxy resin in order to consolidate the loose material, and prevent a bypass "channelling" effect when subjected to differential pressures, or when the outer screen suffers erosion damage. While epoxy bonding reduces the channeling effect, epoxy or formaldehyde based phenolic resin coated sands are acid reactive, often causing their bonding agents to disintegrate when exposed to acidic formation fluid or acidic workover fluids. Conventional prepack material such as silica sand is also acid soluble in hydrochloric acid (HCL), and is especially soluble in hydrofluoric acid (HF). Thus, acidizing procedures and other corrosive procedures which may be necessary to stimulate production, or other corrosive fluids which may be present in production fluids, may dissolve the prepack.

OBJECTS OF THE INVENTION

The principle object of the present invention is to provide a homogeneous pre-pack body of sintered, substantially spherical plastic members which will prevent channeling of the pre-pack when the outer particulate screen has been eroded way, thus exposing the pre-pack, and thereby restrain premature failure of production components due to sand erosion. In accordance with this object, it is another object of the present invention to provide a gravel pre-pack which is void free.

Another object of the invention is to provide a tubular sand screen which is resistant to acid treatment and stimulation compounds as well as high chloride well conditions.

A further object of the present invention is to provide an interlocked pre-pack body which is ductile to restrain cracking from normal bending stresses, which may occur during handling and while lowering the tool to the production zone in the wellbore.

A related object of the invention is to provide a sand screen which can exclude sand fines from inflowing formation fluid during the initial production phase following a gravel pack operation, without limiting production of formation fluid.

Another object of the invention is to provide a sand screen which has a homogeneous pore size to exclude sand fines of a predetermined size.

Another object of the invention is to provide a sand screen having integrally formed, threaded end fittings for attachment directly to production tubing.

Another related object of the invention is to provide a sand screen useful in shallow water and environmental wells which does not require a tubular mandrel.

SUMMARY OF THE INVENTION

The foregoing objects of the present invention are provided by a prepack well screen assembly having inner and outer screens concentrically mounted in radially spaced relation onto an inner mandrel. In this embodiment, the outer screen is radially spaced with respect to the inner screen, thereby defining a prepack annulus for receiving a prepack of spherical acid resistant plastic beads, which are sintered in place to form a permeable homogenous prepack with a uniform pore size. Consequently, a prepack well screen assembly is provided such that erosion failure in the outer screen will not result in channeling in the prepack and the resultant production of sand and premature failure of production components. In both the inner and outer screens, the longitudinal spacing distance between adjacent turns selectively excludes sand fines of a predetermined minimum size. The outer screen wire may be substantially greater in size than the corresponding dimension of the inner retention screen wire.

In one embodiment, the inner screen is radially spaced with respect to the mandrel, thereby defining a flow bypass annulus. In another embodiment, useful in shallow water and environmental wells where stress level experienced by the well screen are less, the inner screen serves the function of the mandrel. In an alternate embodiment useful in shallow and environmental wells where the stress levels are very low, the well screen may comprise only a tubular body of sintered, spherical beads, whose central bore provides the production flow path. In this embodiment, the tubular body of sintered, spherical beads is attached between threaded end fittings for attachment directly to production tubing.

BRIEF DESCRIPTION OF THE DRAWINGS

The foregoing objects and features of the present invention will become more readily apparent and may be understood by referring to the following detailed description of the present invention, taken in conjunction with the accompanying drawings, in which:

FIG. 9 is a greatly enlarged pictorial representation of a microscopic section taken through an external surface region of a sintered, substantially spherical plastic prepack made according to the present invention;

FIG. 10 is a greatly enlarged pictorial representation of a microscopic section taken through an external surface region of conventional, irregularly shaped aggregate; and, FIG. 11 is a perspective view, shown partially broken away, of a second embodiment of the prepack well screen assembly constructed according to the teachings of the present invention.

DETAILED DESCRIPTION OF THE PREFERRED EMBODIMENTS

In the description which follows, like parts are indicated throughout the specification and drawings with the same reference numerals, respectively. The drawings are not necessarily to scale and the proportions of certain parts have been exaggerated to better illustrate the details of the invention.

Figure 1:
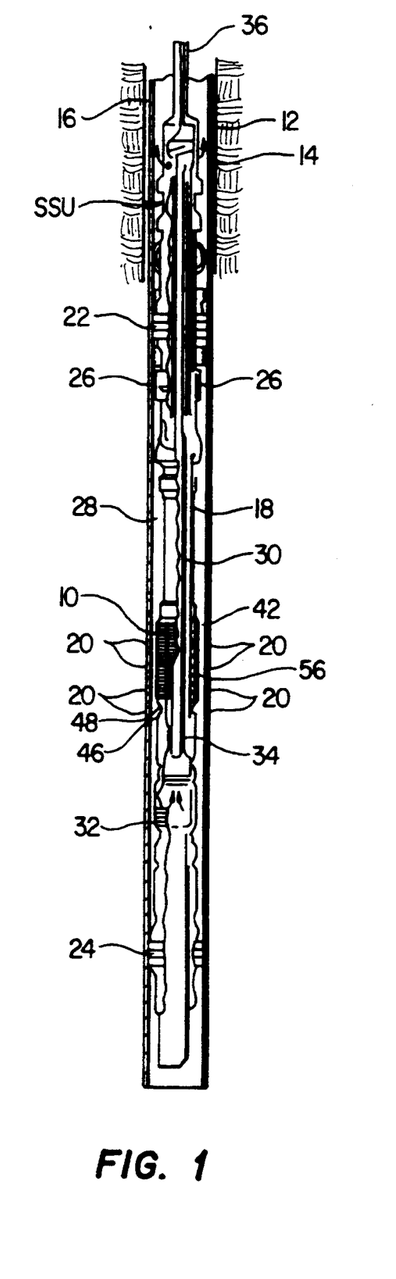
FIG. 1 illustrates a side view, partly in section and partially broken away, of an oil well completion having a prepack well screen assembly according to the present invention suspended at a producing zone.
Figure 2:
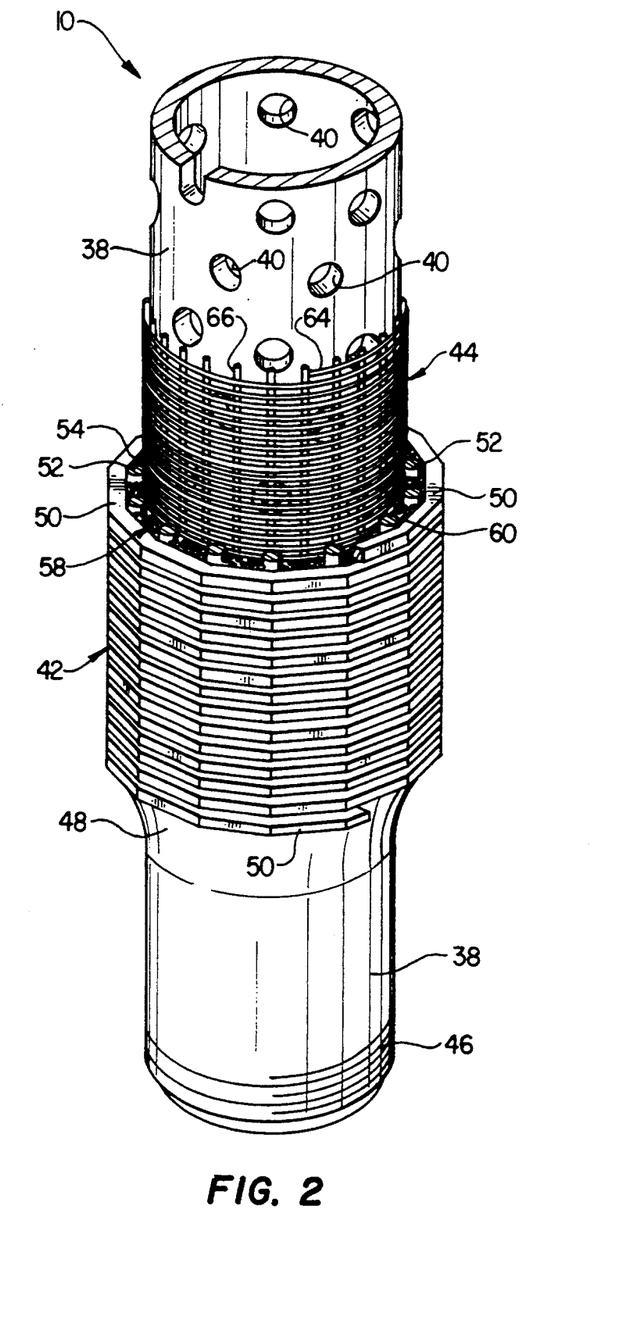
FIG. 2 is a perspective view, shown partially broken away, of a prepack well screen assembly constructed according to the teachings of the present invention.

Referring now to FIGS. 1 and 2, a well screen prepack assembly 10 is shown incorporated in a conventional subsurface well completion. A well bore 12 has been reinforced by tubular casing 14 and sealed with cement 16. A production tubing 18 has been run inside casing 14. Casing 14 is perforated by openings 20 at the depth where production fluids are to flow from the producing zone of the well into production tubing 18.

Well screen 10 is located opposite perforations 20 in casing 14 as production tubing 18 is run into the well, or it may be run directly opposite an open formation. The annulus between the production tubing 18 and the casing 14 is sealed off by an upper packer 22 and a lower packer 24 to produce formation fluids from the producing zone only.

Flow ports 26 are provided in the tubing string 18 below the upper packer 22 and above the sand screen 10 through which gravel mixed with water or gel is injected or circulated by a service seal unit (SSU) into the annulus 28 between the casing 14 and the sand screen 10. To do so, a wash pipe may be run inside the tubing string 18 to spot the gravel slurry of water and/or gel below the sand screen 10 or around a telltale screen 32 which is mounted below the primary sand screen 10. By providing the primary sand screen 10 and the lower telltale screen 32, premature gravel packing around the primary screen is prevented and a sand bridge is thus avoided at that spot.

A polished bore nipple 34 is run between the primary screen 10 and the telltale screen 32 in which the wash pipe 30 is landed in sealing engagement in order to circulate the slurry to the telltale screen 32. In this way, any premature spotting of gravel is prevented. When the annulus 28 between the casing 14 and the screen 10 is fully packed, the surface pumps will indicate a pressure jump, which serves to squeeze the remaining water and/or gel from the annulus into the formation. The slurry of gel and gravel is then dehydrated by the oil or gas bearing formation. At the same time, the perforations 20 are filled with gravel. A greater jump in pressure indicates the conclusion of the gravel pack operation. Finally, the wash pipe 30 is pulled out of the polished nipple 34 and the service seal unit SSU is pulled out of engagement with the packer 22 by retraction of a work string 36.

The primary sand screen 10 is illustrated in detail in FIG. 2. The primary sand screen 10 is a prepacked assembly which includes a perforated tubular mandrel 38 of a predetermined length, for example, 20 feet. The tubular mandrel 38 is perforated by radial bore flow passages 40 which may follow parallel spiral paths along the length of the mandrel 38. The bore flow passages 40 provide for fluid through the mandrel 38 to the extent permitted by an external screen 42, the porous prepack body 58, described hereafter, and an internal screen 44, when utilized. The bore flow passages 40 may be arranged in any desired pattern and may vary in number in accordance with the area needed to accommodate the expected formation fluid flow through the production tubing 18.

The perforated mandrel 38 preferably is fitted with a threaded pin connection 46 at its opposite ends for threaded coupling with the polished nipple 34 and the production tubing 18. The outer wire screen 42 is attached onto the mandrel 38 at opposite end portions thereof by annular end welds 48.

Figure 3:
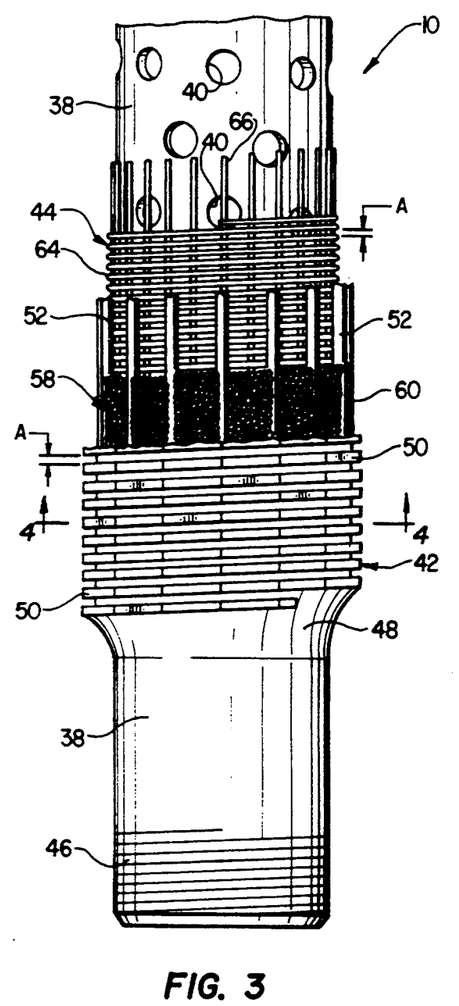
FIG. 3 is a side view, shown partially broken away, of the prepack well screen assembly shown in FIG. 2.
Figure 4:
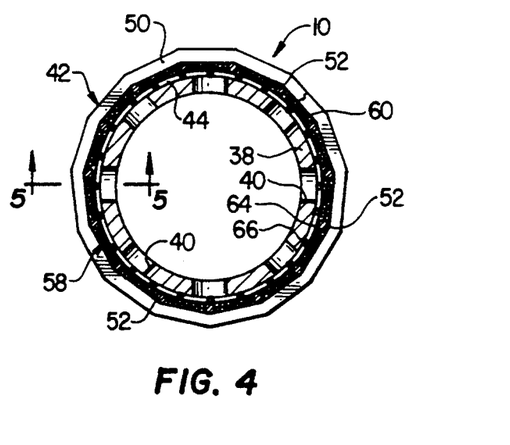
FIG. 4 is a cross sectional view of the prepack well screen assembly taken along cut lines 4—4 of FIG. 3.

The outer screen 42 is a fluid-porous, particulate restricting member which is formed separately from the mandrel 38. In the embodiment of FIGS. 2 and 3, the outer screen 42 has an outer screen wire 50 which is wrapped in multiple turns onto longitudinally extending outer ribs 52, preferably in a helical wrap. The turns of the outer screen wire 50 are longitudinally spaced apart from each other, thereby defining rectangular fluid flow apertures Z therebetween. The apertures Z are framed by the longitudinal ribs 52 and wire turns for conducting formation fluid flow while excluding sand and other unconsolidated formation material.

Figure 5:
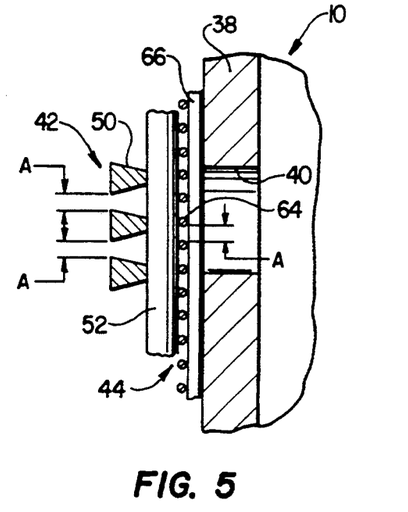
FIG. 5 is a detailed, cross sectional view of a portion of the prepack well screen assembly taken along cut lines 5—5 of FIG. 4.
Figure 6:
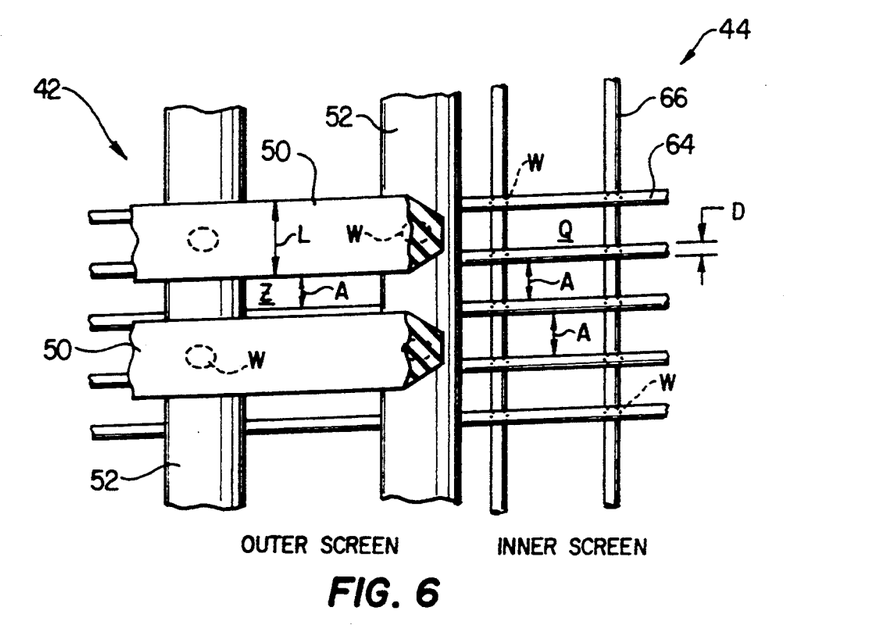
FIG. 6 is an enlarged, perspective view of the outer screen and inner screen, shown partially broken away, of the prepack well screen assembly shown in FIG. 2.

As shown in FIG. 5, the outer screen wire 50 is typically 90 mils wide by 140 mils tall in a generally trapezoidal cross section. The maximum longitudinal spacing A between adjacent turns of the outer wire wrap is determined by the maximum diameter of the fines which are to be excluded. Typically, the aperture spacing A between adjacent wire turns is 20 mils. This provides approximately 20 square inches of inlet flow area per linear foot through the outer screen 42, assuming an outside diameter of 2.97 inches.

The outer screen wire 50 and the outer ribs 52 are formed of stainless steel or other weldable material and are joined together by resistance welds W at each crossing point of the outer screen wire 50 onto the outer ribs 52 so that the outer screen 42 is a unitary assembly which is self-supporting prior to being mounted onto the mandrel 38. The outer ribs 52 are circumferentially spaced with respect to each other and have a predetermined diameter for establishing a prepack annulus 54 of an appropriate size for receiving the annular prepack body 58, described hereafter. The longitudinal ribs 52 serve as spacers between the inner prepack screen 44 and the outer screen 42. The fines which are initially produced following a gravel pack operation have a fairly small grain diameter, for example, 20–40 mesh sand. Accordingly, the spacing dimension A (FIG. 5) between adjacent turns of the outer screen wire 50 is selected to exclude sand fines which exceed 20 mesh.

In the embodiment of FIGS. 2 and 3, the prepack body 58 is concentrically disposed in the prepack annulus 54 located between the inner screen 44 and outer screen 42. The prepack body 58 is thus stabilized by engagement against the inner screen 44 and the outer screen 42. The prepack body 58 comprises a permeable body of chemically inert to oil and gas fluids, acid resistant substantially spherical plastic members or beads 60, which are heated or sintered until they fuse and bond to each other and form a unitary, homogeneous body having a uniform pore size. Each of the spherical plastic beads 60 has a similar predetermined diameter such as 25 or 65 millimeters, with the larger diameter bead producing a more permeable sintered body with a larger pore size.

Each of the spherical plastic beads 60 is a plastic which is insoluble in 15% hydrochloric acid, and which is bonded together by sintering to form a homogenous mass to provide a uniform pore size. Suitable acid resistant plastic materials for forming the spherical plastic beads 60 are those comprising a resin selected from the group consisting of a polymer or copolymer of acrylic acid, methacrylic acid, esters of such acids and acrylonitrile; polyester; urea-formaldehyde; melamine-formaldehyde; and styrene-divinylbenzene. Copolymers of styrene-divinylbenzene resin are available from Dow Chemical Company, and are available in spherical bead form from Sun Drilling Products Corporation. The spherical plastic beads 60 are thus resistant to contact with formation fluids having a pH of from about 6 to about 12, as well as corrosive formation fluids containing sulfurous compounds such as hydrogen sulfide or sulphur dioxide in concentrations up to about 20 g by weight.

Because of the perfect roundness of the beads 60, non-interlocked beads offer almost no resistance to the passage of objects in comparison to conventional aggregate material such as sand wherein the slight angularity of the aggregate causes surfaces to engage at angles to provide some resistance to the passage of objects through the aggregate. The lack of resistance offered by non-interlocked beads can be demonstrated by filling a cup with spherical plastic beads, through which a pencil may easily be pushed to the bottom of the cup. The "lubricity" or "ball-bearing" effect of spherical beads is why both glass and styrene-divinylbenzene beads have found success in the drilling, extended bit life, field. Such lubricity is disclosed in U.S. Pat. No. 4,063,603, which discloses a method in which spherical plastic beads are added to a drilling mud to provide lubrication to reduce torque and drag on the drill string to smooth drilling operations downhole. However, interlocking the beads 60 together by sintering or heating the beads until the fuse and bond as provided by the present invention acts to restrain differential pressure channeling, as well as channeling due to erosion failure of the outer screen 42.

The beads 60 may be bonded together by sintering or heating the beads 60 for about one hour to about two hours at a temperature in the range of approximately 450 degrees Fahrenheit to about 525 degrees Fahrenheit. Depending on the particular dimensions of the embodiment and any time necessary to conduct heat through the outer screen 42, the inner screen 44 and the mandrel 38, styrene-divinylbenzene may be bonded together by heating the beads for about one hour at a temperature of approximately 475 degrees Fahrenheit. The heat causes the spherical beads 60 to fuse to each other at their contacting surfaces and interlock, thus providing a sintered, homogeneous permeable body 58. Preferably, heating will occur at a temperature less than 1000 degrees Fahrenheit until the beads 60 fuse to each other and form an interlocked body, but without a substantial alteration in the spherical shape of the beads 60 occurring, thus providing a uniform pore space 62 as discussed hereafter. Because of the high closure (granular) strength of styrene-divinylbenzene, i.e. 20,000 p.s.i., the interlocked body 58 provided by sintering the beads 60 until they fuse together and interlock is resistant to differential pressure channelling, as well as channelling resulting from erosion failure of the outer screen 42.

Styrene-divinylbenzene is a ductile material. Thus, when the beads 60 are sintered or heated until the beads 60 interlock into a homogeneous body, the interlocked body 58 is ductile, and therefore resistant to cracking under normal bending stress encountered during handling and while running the well screen to depth. Cracking can lead to high entrance velocity passages which in turn can cause catastrophic erosion damage. Thus, the well screen of the present invention is capable of withstanding rough run-in handling, and the effects of cracking caused by normal bending stress is avoided. In contrast, the resin link cementing together conventional resin coated silica provides little ductility, and conventional prepacks of resin coated silica are highly susceptible to cracking from bending forces encountered during rough handling, shipping and running the resin coated prepack in deviated well bores.

Figures 9, 10, 11:
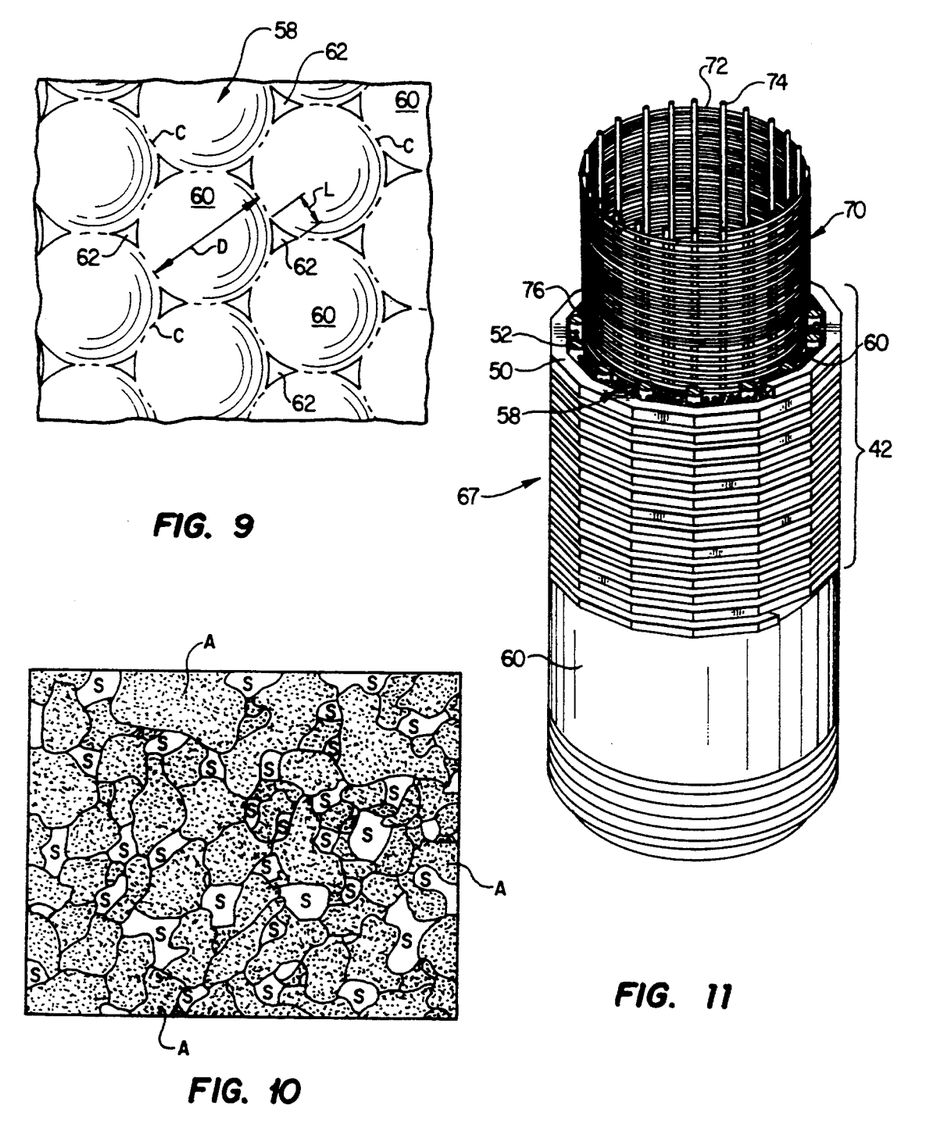

As shown in detail in FIG. 9, the pore space 62 between beads 60 having a constant diameter D are similarly sized, thus a uniform pore size L is provided. As shown in detail in FIG. 10, the matrix pore size S of irregularly shaped aggregate material A varies, and only an average pore size can be predicted, which allows for the passage of fines which are larger than the average pore size. However, as shown in detail in FIG. 9, the sintered, spherical beads 60 of the present invention provide a homogeneous, permeable body 58 having a uniform pore size L, which is related directly to the diameter D of the bead. Passage of fines larger than the uniform pore size L is thus uniformly restricted, and the size of the particulate matter to be screened out can be predicted as a function of the bead size D. Consequently, based on nearby experience with unconsolidated sands, the bead size diameter D can be chosen so that the expected particulate matter size can be effectively filtered out of the formation fluid. Because the beads 60 are sintered until they bond at their contacting points C into a homogeneous body, channelling is restrained and the sintered body forms a barrier to prevent the passage or particulate matter of a predetermined size.

Vibration may be used to pack the beads 60 into a void free body (applicants however wish to point out that the sense of the meaning in which void is used in the application does not mean pore size). Because of the angularity of the conventional resin and non-resin sands, the use of vibration and gravity may fail to place angular aggregate material in a void free body, which allows for channeling to occur. This eventually leads to an erosive cut leakage path through the screen and generally yields a catastrophic failure. However, due to the round, ball bearing effect of the spherical plastic members, the spherical plastic members form a void-free body, even in narrowly dimensioned prepack annulus arrangements when packed together. Thus, when the plastic beads 60 are sintered until they bond together, a homogeneous void-free permeable body 58 is provided.

Referring again to the embodiment of FIGS. 2 and 3 for details of assembly, the inner screen 44 is concentrically disposed between the tubular mandrel 38, and the outer screen 42. The inner retention screen 44 is thus stabilized by engagement against the outer longitudinal ribs 52. The prepack annulus 54 is defined between the inner wire screen 44 and the outer wire screen 42.

The inner screen 44 is separately formed from the mandrel 38 and from the outer screen 42. The inner screen 44 includes a narrow gauge stainless steel wire 64 which is wrapped onto longitudinally extending inner ribs 66, preferably in a helical wrap. The turns of the inner screen wire 64 are axially spaced apart form each other by the same spacing A as the outer screen wire turns 50, thereby providing rectangular fluid flow passages Q for conducting formation fluid while excluding sand fines. The inner screen wire 64 and the inner ribs 66 are formed of stainless steel or other weldable material and are joined together by resistance welds W at each crossing point of the inner screen wire onto the inner ribs 66 so that the inner screen 44 is a unitary assembly which is self supporting prior to being mounted onto the outer screen 42.

After the inner screen 44 has been separately assembled, it is mounted onto the perforated mandrel 38. That is, the mandrel 38 is inserted into the bore of the inner screen 44. Next, the separately assembled outer screen 42 is mounted onto the inner screen/mandrel subassembly. The outer ribs 52, the inner ribs 66, the inner wrapping wire 64, and the outer wrapping wire 50 are welded together onto the lower end of mandrel 38 via lower annular weld 48.

The spherical plastic members or beads 60 are then loaded into the open prepack annulus 54 at the opposite open end and packed via the aid of vibration as described in the foregoing to create a void free prepack, filling the prepack annulus 54. As may be appreciated, the annulus 54 formed between the outer screen 42 and inner screen 44 forms a mold in which the beads 60 may be sintered in place. After the beads have been loaded into the prepack annulus 54, the opposite end portions of the outer longitudinal ribs 54, the inner longitudinal ribs 66, the outer screen wire turns 50 and the inner screen wire 64 are joined together and secured to the upper end of the mandrel 38 via upper annular weld 48. According to this arrangement, the outer screen 42, the inner screen 44 and the prepack of sintered, plastic beads becomes a unitary part of the mandrel 38.

The entire assembly 10 is then heated to a temperature of approximately 450 degrees Fahrenheit to about 525 degrees Fahrenheit for about one to two hours to fuse or bond the beads 60 together and form a homogeneous interlocked body 58 having a uniform porosity as described in the foregoing. After the prepack has been sintered as described above, thus bonding the plastic beads together to form a homogeneous acid resistant permeable prepack with uniform pores, the well screen assembly 10 is ready for service.

The longitudinal inner ribs 66 stabilize the inner screen wire turns 64 while also serving as a standoff for spacing the inner screen wire turns 64 radially with respect to the external surface the mandrel 38. The outer longitudinal ribs 52 provide radial spacing between the inner screen 44 and outer screen 42, thereby centering the inner screen concentrically within the outer screen. Exemplary, the diameters of both the inner ribs 66 and the inner screen wire 64 are preferably in the range of from about 0.016 inch to about 0.055 inch.

Figure 7:
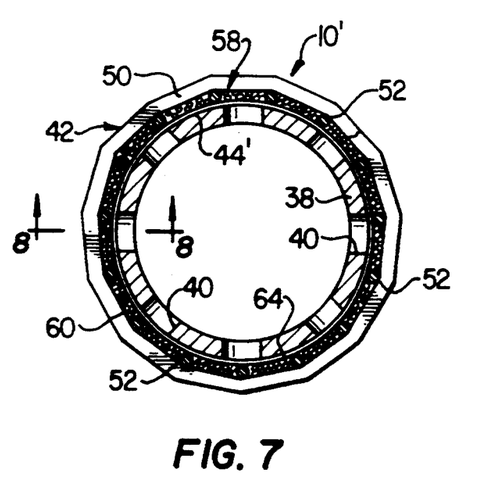
FIG. 7 is a sectional view of an alternate embodiment of the prepacked well screen assembly.
Figure 8:
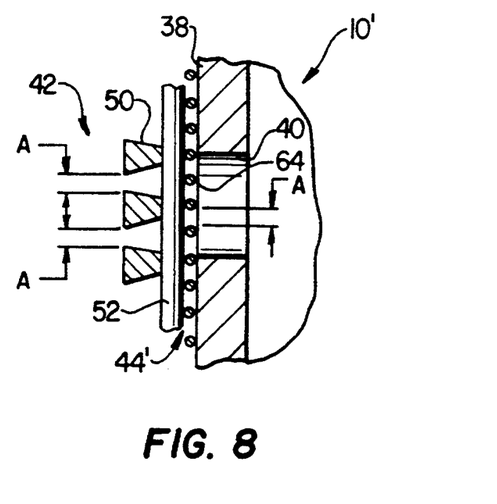
FIG. 8 is an enlarged, perspective view of the outer screen and inner screen, shown partially broken away, of the prepack well screen assembly shown in FIG. 7.

Referring to FIGS. 7 and 8, a second well screen assembly 10' is illustrated. In this embodiment, the inner screen wire 64 is wrapped directly onto the mandrel 38 with adjacent turns being spaced by a longitudinal distance A. That is, the longitudinally extending rib wires 66 are not utilized in this alternative embodiment. Instead, the inner screen wire 64 is wrapped directly onto the perforated mandrel 38, for example by the method as disclosed in U.S. Pat. No. 3,785,409; U.S. Pat. No. 3,958,634; and U.S. Pat. No. 3,908,256, all assigned to the assignee of the present invention, Howard Smith Screen Company of Houston, Tex.

In this alternative embodiment, the longitudinal spacing distance A between adjacent inner screen wire turns 64 is preferably equal to the longitudinal spacing distance A between the outer screen wire turns 50. Fluid flow through the flow apertures Q of the inner screen 44' occurs only through the area of the inner screen 44' which overlaps the mandrel flow apertures 40'.

In another embodiment which does not require the strength of a tubular mandrel, the inner screen may replace the mandrel. This embodiment is useful in shallow water and environmental well where the stress level is lessened, such that a tubular mandrel is not required. Referring to FIG. 11, this embodiment of the well screen prepack assembly, shown generally as 67, has threaded pin connections 68 at its opposite ends for threaded coupling. The outer wire screen 42 includes an outer screen wire 50 which is wrapped in multiple turns onto longitudinally extending outer ribs 52, preferably in a helical wrap, and attached thereto via resistance welds W as before. Similarly, the turns of the outer screen wire 50 are longitudinally spaced apart from each to define fluid flow apertures Z. The outer wire screen 42 is attached onto the threaded pin connections 68 by welding.

In this embodiment, the inner screen 70 also serves the function of the inner mandrel. The inner screen includes a narrow gauge stainless steel wire 72 which is wrapped over longitudinally extending inner ribs 74, preferably in a helical wrap, and attached thereto via resistance welds W as before. Similarly, the turns of the inner screen wire 72 are axially spaced apart from each other by the same spacing distance A as the outer screen wire turns 50. After the outer screen 42 is assembled and mounted onto the inner screen 70, the outer ribs 52, the inner ribs 74, the inner wrapping wire 72, and the outer wrapping wire 50 are welded together onto the lower threaded connection 68.

The beads 60 are then loaded into the prepack annulus 76 formed between the inner screen wire 72, and packed to form a void free prepack via vibration as described above. The upper threaded connection 68 is then welded to the opposite ends of the outer ribs 52, the inner ribs 74, the inner wrapping wire 72 and the outer wrapping wire 50 to close off the annulus 76, and trap the beads 60 within the annulus 76. The entire assembly 67 is then heated to a temperature of about 450 degrees Fahrenheit to about 525 degrees Fahrenheit for about one to two hours as described in the foregoing to fuse the beads 60 together and form a homogeneous interlocked body 58 in the annulus 76. In this embodiment the strength of the well screen prepack assembly 67 comes from the outer screen 42 and the inner screen 70.

In a further alternate embodiment useful in shallow and environmental wells where the stress levels are very low, the well screen may comprise only a tubular body of sintered, spherical beads, whose central bore provides the production flow path. In this embodiment, not illustrated in the FIGS., the tubular body of sintered, spherical beads is attached between threaded end fittings for attachment directly to production tubing. In this embodiment, the tubular body is formed by loading a cylindrical mold with spherical plastic beads 60 and heating the mold as described above to bond the spherical plastic beads together and form an cylindrically shaped interlocked permeable body having a uniform porosity as described in the foregoing.

While the invention has been particularly shown and described with reference to the preferred embodiments, it will be understood by those skilled in the art that various modifications and changes in form and detail may be made therein without departing from the scope and spirit of the invention. Accordingly, modifications such as those suggested above, but not limited thereto, are to be considered within the scope of the invention.

What is claimed is:

1. A well screen for separating particulate material from formation fluid, comprising:
   a tubular mandrel having a bore defining a production flow passage, said mandrel being radially intersected by at least one flow aperture connecting with said flow passage; and
   a plurality of sintered, substantially spherical plastic members along at least a portion of said mandrel covering said flow aperture.

2. The well screen of claim 1, where each of said spherical plastic members is acid resistant and corrosion resistant.

3. The well screen of claim 1, wherein each of said spherical members has essentially the same diameter.

4. The well screen of claim 1, wherein said spherical members are styrene-divinylbenzene.

5. The well screen of claim 1, wherein said well screen further comprises a fluid-porous, particulate-restricting member mounted on said sintered, spherical plastic members.

6. The well screen of claim 5, wherein said sintered, spherical plastic members are formed into a cylindrical shape which is disposed concentrically around said tubular mandrel.

7. The well screen of claim 6, wherein said particulate-restricting member is a cylindrical particulate-restricting member positioned concentrically over said spherical plastic members.

8. The well screen of claim 7, wherein said particulate-restricting member includes
   a plurality of longitudinally extending rib wires circumferentially spaced around said sintered, spherical plastic members, and
   a screen wire wrapped externally about said rib wires in a longitudinally spaced pattern, said rib wires and said screen wire defining a plurality of longitudinally spaced screen apertures for conducting formation fluids through said particulate-restricting member, said longitudinally extending rib wires being disposed between said external screen wire and said sintered, spherical plastic members.

9. The well screen of claim 7, wherein said well screen further comprises a cylindrical inner screen positioned between said sintered, spherical plastic members and said mandrel.

10. The well screen of claim 1, wherein said mandrel is a screen.

11. The well screen of claim 10, wherein said sintered, spherical plastic members are formed into a cylindrical shape which is disposed concentrically around said tubular mandrel, and wherein said screen includes:
    a plurality of longitudinally extending rib wires circumferentially spaced within said sintered, spherical plastic members, and
    a screen wire wrapped in a longitudinally spaced spiral pattern between said spherical plastic members and said rib wires, said rib wires and said screen wire defining a plurality of longitudinally spaced screen apertures connecting with said flow passage defined by said screen wire.

12. A well screen for separating unconsolidated material out of inflowing well fluid in water, oil, gas and recovery well comprising a tubular body of sintered, substantially spherical plastic members, said tubular body having a bore defining a production flow passage.

13. The well screen of claim 12, wherein each of said spherical members has essentially the same diameter.

14. The well screen of claim 12, wherein said spherical members are styrene-divinylbenzene.

15. The well screen of claim 12, wherein said tubular body of sintered, spherical plastic members has a central body portion disposed between first and second radially stepped end portions, said first and second radially stepped end portions each having threaded fittings for connection to threaded coupling collars.

16. A well screen for separating particulate material from formation fluid, comprising:
    a tubular mandrel having a bore defining a production flow passage, said mandrel being radially intersected by at least one flow aperture connecting with said flow passage; and
    filter means along at least a portion of said mandrel covering said flow aperture and interlocked in a homogeneous body having a uniform pore size for conducting formation fluid through said filter means and preventing channelling.

17. The well screen of claim 16, wherein said body is ductile.

18. The well screen of claim 16, wherein said filter means comprises a plurality of sintered, substantially spherical plastic members.

19. The well screen of claim 18, wherein said spherical plastic members are styrene-divinylbenzene.

20. A well screen for separating particulate material from formation fluid, comprising:
    a tubular mandrel having a bore defining a production flow passage, said mandrel being radially intersected by at least one flow aperture connecting with said flow passage;
    tubular screen means spaced from and concentrically surrounding said mandrel to define an annulus, said screen means having at least one screen aperture in communication with said annulus and said flow aperture; and
    a plurality of sintered, substantially spherical members located in said annulus between said screen means and said mandrel and covering said flow aperture.

21. The well screen of claim 20, wherein said screen means includes a plurality of circumferentially spaced, longitudinally extending rib wires; and at least one screen wire wrapped externally about said rib wires in a longitudinally spaced pattern to define a plurality of longitudinally spaced screen apertures for conducting formation fluids through said screen wire.

22. The well screen of claim 21, wherein said mandrel is radially intersected by a plurality of flow apertures, and wherein said plurality of sintered, spherical members cover each flow aperture.

23. The well screen of claim 20, wherein said well screen further comprises a cylindrical, inner screen located in said annulus between said plurality of sintered, spherical plastic members and said tubular mandrel.

24. The well screen of claim 23, wherein said inner screen includes a plurality of longitudinally extending rib wires circumferentially spaced around said mandrel; and at least one screen wire wrapped between said rib wires and said plurality of sintered, spherical plastic members in a longitudinally spaced pattern to define a plurality of longitudinally spaced screen apertures for conducting formation fluids through said inner screen.

25. A well screen for separating particulate material from formation fluid, comprising:
- a tubular mandrel having a bore defining a production flow passage, said mandrel being radially intersected by at least one flow aperture connecting with said flow passage;
- a cylindrical inner screen mounted concentrically around said mandrel and including
  - a plurality of longitudinally extending rib wires spaced circumferentially around said mandrel, and
  - a screen wire wrapped externally about said rib wires in a longitudinally spaced pattern to define longitudinally spaced screen apertures in communication said flow aperture for conducting formation fluids through said inner screen;
- a cylindrical fluid-porous, particulate-restricting member mounted concentrically around said inner screen and radially spaced therefrom to form a prepack annulus, said particulate-restricting member including
  - a plurality of circumferentially spaced, longitudinally extending rib wires located in said prepack annulus and spaced circumferentially around said inner screen, and
  - a screen wire wrapped externally about said rib wires to define said annulus in a longitudinally spaced pattern to delineate longitudinally spaced screen apertures for conducting formation fluids through said outer screen; and
- a plurality of sintered, substantially spherical plastic members disposed within said prepack annulus between said particulate-restricting member and said inner screen and covering said flow aperture.

26. A well screen for separating particulate material from formation fluid, comprising:
- a tubular mandrel having a bore defining a production flow passage, said mandrel being radially intersected by at least one flow aperture connecting with said flow passage; and
- an acid resistant, corrosion resistant permeable plastic member disposed along at least a portion of said mandrel and covering said flow aperture.

27. The well screen of claim 26, wherein said acid resistant permeable plastic member is a chemically inert plastic member.

28. The well screen of claim 26, wherein said acid resistant permeable plastic member comprises a plurality of sintered, spherical plastic members.

29. A well screen for separating unconsolidated material out of inflowing well fluid in water, oil, gas and recovery well comprising a tubular body of acid resistant permeable plastic, said tubular body having a bore defining a production flow passage.

30. The well screen of claim 29, wherein said tubular body of acid resistant permeable plastic is a tubular body composed of a plurality of sintered, substantially spherical plastic members.

* * * * *